United States Patent
Kamiyama et al.

[11] Patent Number: 5,916,406
[45] Date of Patent: Jun. 29, 1999

[54] BRANCH PIPE LINER BAG AND PIPE LINING METHOD

[75] Inventors: Takao Kamiyama, Hiratsuka; Yasuhiro Yokoshima, Ibaraki-ken; Shigeru Endoh, Yasato-machi; Hiroyuki Aoki, Tokorozawa, all of Japan

[73] Assignees: Shonan Gosei-jushi Seisakusho KK, Kanagawa-ken; Yokoshima & Company; GET Inc., both of Ibaraki-ken; OAR Company, Saitama-ken, all of Japan

[21] Appl. No.: 08/827,487

[22] Filed: Feb. 11, 1997

[30] Foreign Application Priority Data

Feb. 14, 1996 [JP] Japan .................................... 8-027044
Jan. 20, 1997 [JP] Japan .................................... 9-007373

[51] Int. Cl.$^6$ .......................... B29C 63/36; B29C 65/56; B29C 65/70
[52] U.S. Cl. .......................... 156/287; 138/97; 156/252; 156/294; 264/249; 264/269; 264/516
[58] Field of Search ................. 156/91, 94, 252, 156/287, 294; 264/36.17, 36.22, 249, 516, 269; 138/97, 98, 109

[56] References Cited

U.S. PATENT DOCUMENTS

| 4,274,901 | 6/1981 | Elber ....................................... 156/252 |
| 5,329,063 | 7/1994 | Endoh ...................................... 156/287 |
| 5,566,719 | 10/1996 | Kamiyama et al. .................... 156/287 |
| 5,692,543 | 12/1997 | Wood ........................................ 156/94 |

FOREIGN PATENT DOCUMENTS 1-192524  8/1989  Japan ..................................... 156/294

*Primary Examiner*—Steven D. Maki
*Attorney, Agent, or Firm*—Whitham, Curtis & Whitham

[57] ABSTRACT

A branch pipe liner bag and a pipe lining method are provided for ensuring to securely joining a flange and a main pipe liner bag to provide a reliable integrated structure. The branch pipe liner bag comprises a tubular resin-absorbent material impregnated with an unhardened hardenable resin. The tubular resin-absorbent material is formed at one end thereof with a rigid flange which is formed with a plurality of bores. In the pipe lining method using the branch pipe liner bag, a portion of unhardened hardenable resin oozing from a main pipe liner bag enters the bores formed through the flange of the branch pipe liner bag and is hardened therein, so that the flange is securely joined with the main pipe liner bag, thereby preventing a gap from being formed therebetween. In addition, the bores may be arranged on concentric circles on the flange, and cords made of a resin-absorbent material may be passed through the bores along the inner or outer periphery of the flange. Since the unhardened hardenable resin is also impregnated into the cords, the flange is more securely joined with the main pipe liner bag. Furthermore, a portion of the main pipe liner bag located on the periphery of a branch pipe opening is protruded due to the cords, so that the protrusion facilitates the positioning of a cutter for accurately cutting a portion of the main pipe liner bag covering the branch pipe opening.

7 Claims, 17 Drawing Sheets

BRANCH PIPE LINER BAG AND PIPE LINING METHOD

BACKGROUND OF THE INVENTION

1. Field of the Invention

The present invention relates generally to branch pipe lining techniques, and more particularly, to a branch pipe liner bag for lining inner walls of branch pipes. The present invention is also directed to a pipe lining method which is implemented using the branch pipe liner bag and a main pipe liner bag.

2. Description of the Related Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. The pipe lining method utilizes a tubular pipe liner bag made of a resin-absorbent material impregnated with a hardenable resin, and having the outer surface covered with a highly air-tight plastic film. The tubular pipe liner bag is inserted into a pipe to be repaired by means of a pressurized fluid such that the pipe liner bag is turned inside out as it proceeds deeper in the pipe. Hereinafter, this manner of insertion shall be called "everting". When the entire length of the tubular liner bag is everted (i.e., turned inside out) into the pipe, the everted tubular liner is pressed against the inner wall of the pipe by a pressurized fluid, and the tubular flexible liner is hardened as the hardenable resin impregnated in the liner is heated, which is effected by heating the fluid filling the tubular liner bag. It is thus possible to line the inner wall of the defective or old pipe with a rigid liner without digging the ground and disassembling the pipe sections.

The foregoing pipe lining method can be similarly applied to the lining of a main pipe of sewerage pipes or the line and a branch pipe branched off the main pipe.

Conventionally, a branch pipe liner bag for lining a branch pipe, as illustrated in FIG. 20, has been proposed. Specifically, FIG. 20 is a partially exploded perspective view illustrating a conventional branch pipe liner bag 101 which has a tubular resin-absorbent material 104 made of unwoven fabric, such as polyester or the like, having its outer surface covered with a highly air-tight plastic film, with an unhardened liquid hardenable resin impregnated in the tubular resin-absorbent material 104.

The tubular resin-absorbent material 104 has one end turned around to form a flange 105 which is curved to substantially match the curvature of a main pipe 110 (see FIG. 21), later described, and has the outer diameter larger than the inner diameter of a branch pipe 111 (see FIG. 21). The flange 105 holds the foregoing curved shape with a hardened hardenable resin impregnated therein.

Next, a pipe lining method using the branch pipe liner bag 101 of FIG. 20 will be described below with reference to FIGS. 21–23.

FIGS. 21–23 are cross-sectional views illustrating the pipe lining method in the order of steps. Referring first to FIG. 21, there are illustrated a main pipe 110 and a branch pipe 111 branched off the main pipe 110 and having a diameter smaller than that of the main pipe 110. Within the main pipe 110, a work robot 112, which had previously been assembled on the ground, a pressure bag 113, a branch pipe liner bag 101, and so on have been introduced for lining operations.

A set nozzle 116 is attached to a head 114 of the work robot 112. The flange 105 of the branch pipe liner bag 101 is securely set on the set nozzle 116, while the remaining portion of the branch pipe liner bag except for the flange 105 (uneverted portion) is accommodated in the pressure bag 113 as illustrated.

The flange 105 of the branch pipe liner bag 101 is positioned at a branch pipe opening 110a of the main pipe 110, while monitoring the situation inside the main pipe 110 and the branch pipe 111 on the ground through a TV camera 115 installed on the work robot 112 and a TV camera 140 introduced into the branch pipe 111. Subsequently, the head 114 of the work robot 112 is moved upwardly to press the flange 105 of the branch pipe liner bag 101 onto the periphery of the branch pipe opening 110a of the main pipe 110 to provide a close contact between the flange 105 and the periphery of the branch pipe opening 110a.

Next, a compressor, not shown, installed on the ground is driven to supply compressed air to the pressure bag 113 through an air hose to cause the branch pipe liner bag 101, receiving the pressure of the compressed air, to evert and extend toward the ground in a direction indicated by an arrow, as illustrated by broken lines in FIG. 21.

After the branch pipe liner bag 101 is inserted inside out into the branch pipe 111 over the entire length thereof, the hardenable resin impregnated in the branch pipe liner bag 101 is hardened by an arbitrary method, with the branch pipe liner bag 101 remaining pressed onto the inner wall of the branch pipe 111, whereby the inner wall of the branch pipe 111 is lined with the hardened branch liner bag 101. In this way, the branch pipe 111 is repaired.

After the lining of the branch pipe 111 is completed, the main pipe 110 is next lined in the following manner.

As illustrated in FIG. 22, a main pipe liner bag 125 is inside out inserted into the main pipe 110 by a pressure of compressed air. It will be understood that the main pipe liner bag 125 is fabricated in a similar manner to the branch pipe liner bag 101 and includes a tubular resin-absorbent material impregnated with a hardenable resin and having at least the outer surface covered with a highly air-tight plastic film.

When the main pipe liner bag 125 has been inserted inside out into the main pipe 110 over the entire length thereof, the hardenable resin impregnated in the main pipe liner bag 125 is hardened by an arbitrary method with the main pipe liner bag 125 remaining pressed onto the inner surface of the main pipe 110, whereby the inner surface of the main pipe 110 is lined with the main pipe liner bag 125. In this way, the main pipe 110 is also repaired. It should be noted that when the main pipe liner bag 125 is hardened, the flange 105 of the branch pipe liner bag 101 is joined with the main pipe liner bag 125 so as to simultaneously harden a hardenable resin attached to the flange 105 of the branch pipe liner bag 101.

After the lining of the main pipe 110 is completed as described above, a cutter 138 mounted at the front end of the work robot 137, introduced into the main pipe 110, is driven to rotate to cut the main pipe liner bag 125 covering the branch pipe opening 110a, while monitoring the situation inside the main pipe 110 through the TC camera 139 installed on the work robot 137. In this way, the branch pipe 111 is open to the main pipe 110 so that the branch pipe 111 is placed in communication with the main pipe 110.

The conventional branch pipe liner bag 101, however, has a problem with respect to the flange 105. Specifically, the flange 105 is previously hardened and is not impregnated with an unhardened hardenable resin. While a portion of the hardenable resin oozing out of the main pile liner bag 125 is attached to the flange 105 and hardened thereon to join the flange 105 with the main pipe liner bag 125, such a small amount of hardenable resin is not sufficient to ensure the integration of the flange 105 and the main pipe liner bag 125. Such insufficient joining often causes a gap to be formed between the flange 105 and the main pipe liner bag 125, and moreover, underground water or the like may intrude into the main pine 110 through the gap.

Additionally, in the operation using the cutter 138 to cut a portion of the main pipe liner bag 125, since a definite mark indicative of a cut portion is not provided for facilitating the cutting operation, the positioning of the cutter 138, which must be achieved through the monitoring of the TV camera 139, is quite difficult, and therefore an accurate cutting operation is hardly expected.

OBJECTS AND SUMMARY OF THE INVENTION

In view of the problems mentioned above, it is an object of the present invention to provide a branch pipe liner bag and a pipe lining method which are capable of securely joining a flange and a main pipe liner bag to ensure a reliably integrated structure therebetween.

It is another object of the present invention to provide a branch pipe liner bag and a pipe lining method which allow for easy and accurate cutting of a portion of a branch pipe liner bag covering a branch pipe opening.

To achieve the above objects, according to a first aspect of the present invention, there is provided a branch pipe liner bag comprising a tubular resin-absorbent material impregnated with an unhardened hardenable resin, and a rigid flange formed at one end of the tubular resin-absorbent material, the flange formed with a plurality of bores extending therethrough.

Preferably, at least one cord made of a resin-absorbent material may be passed through at least a portion of the plurality of bores formed through the flange to couple adjacent ones of the bores by the cord.

Also preferably, the plurality of bores may be positioned on a concentric circle along the inner periphery of the flange of the tubular resin-absorbent material, and at least one cord made of a resin-absorbent material is passed through the bores to couple adjacent ones of the bores by the cord.

The branch pipe liner bag may further comprise at least one resin-absorbent material member on a surface of the flange of the tubular resin-absorbent material. In this branch pipe liner bag, the resin-absorbent material member may include a hard layer on a side to be contacted with the flange.

The branch pipe liner bag may further comprise a bored plate attached on a surface of the flange of the tubular resin-absorbent material.

Further preferably, the branch pipe liner bag may further comprise a tear-off tube attached on the outer surface of the tubular resin-absorbent material near the flange.

According to a second aspect of the present invention, there is provided a pipe lining method comprising the steps of:

preparing a branch pipe liner bag comprising a tubular resin-absorbent material impregnated with an unhardened hardenable resin, and a rigid flange formed at one end of the tubular resin-absorbent material, the flange formed with a plurality of bores extending therethrough;

inserting the branch pipe liner bag into a main pipe;

pressing the flange of the branch pipe liner bag onto the periphery of a branch pipe opening of the main pipe;

inserting the branch pipe liner bag inside out into a branch pipe from the main pipe side to the ground by a fluid pressure with the flange remaining pressed onto the periphery of the branch pipe opening;

hardening the hardenable resin impregnated in the branch pipe liner bag with the branch pipe liner bag pressed onto the inner surface of the branch pipe;

preparing a main pipe liner bag comprising a tubular resin-absorbent material impregnated with a hardenable resin;

inserting the main pipe liner bag inside out into the main pipe by a fluid pressure;

pressing the main pipe liner bag onto the inner surface of the main pipe;

hardening the hardenable resin impregnated in the main pipe liner bag with the main pipe liner bag remaining pressed on the inner surface of the main pipe;

after hardening the main pipe liner bag, cutting a portion of the main pipe liner bag covering the branch pipe opening.

Preferably, the pipe lining method may further comprise the step of passing at least one cord made of a resin-absorbent material through at least a portion of the plurality of bores formed through the flange to couple adjacent ones of the bores by the cord before the step of inserting the branch pipe liner bag into the main pipe.

Also preferably, in the pipe lining method, the plurality of bores may be positioned on a concentric circle along the inner periphery of the flange of the branch pipe liner bag, and the cord is passed through the bores to couple adjacent ones of the bores by the cord.

In the pipe lining method, a resin-absorbent material member may be attached on a surface of the flange of the branch pipe liner bag. The resin-absorbent material member may include a hard layer on a side to be contacted with the flange.

Further preferably, a bored plate may be attached on a surface of the flange of the tubular resin-absorbent material.

According to the pipe lining method of the present invention utilizing the branch pipe liner bag, a portion of unhardened hardenable resin oozing from the main pipe liner bag enters the bores formed through the flange of the branch pipe liner bag and is hardened therein, so that the flange of the branch pipe liner bag is securely joined with the main pipe liner bag, thus preventing a gap from being formed therebetween.

When the at least one cord made of a resin-absorbent material is used, the unhardened hardenable resin oozing from the main pipe liner bag not only enters the bores formed through the flange but also is impregnated into the cord, so that the flange of the branch pipe liner bag is more securely joined with the main pipe liner bag to provide a reliably integrated structure.

When the pipe lining method is implemented using the branch pipe liner bag wherein the plurality of bores are positioned on a concentric circle along the inner periphery of the flange of the tubular resin-absorbent material, and at least one cord made of a resin-absorbent material is passed through the bores to couple adjacent ones of the bores by the cord, a portion of the main pipe liner bag located on the periphery of a branch pipe opening is protruded due to the underlying cord, so that a cutter may be positioned with the protrusion serving as a guide to readily and accurately cut a portion of the main pipe liner bag covering the branch pipe opening.

When the pipe lining method is implemented using the branch pipe liner bag further comprising at least one resin-absorbent material member on a surface of the flange of the tubular resin-absorbent material, wherein the resin-absorbent material member includes a hard layer on a side to be contacted with the flange, a portion of unhardened hardenable resin oozing from the main pipe liner bag not only enters the bores formed through the flange of the branch pipe liner bag and is hardened therein, but also is impregnated into the resin-absorbent material member attached on the surface of the flange (the surface in contact with the main pipe liner bag), so that the flange of the branch pipe liner bag is more securely joined with the main pipe liner bag to provide a reliably integrated structure.

When the pipe lining method is implemented using the branch pipe liner bag further comprising a bored plate attached on a surface of the flange of the tubular resin-absorbent material, a portion of unhardened hardenable resin oozing from the main pipe liner bag enters the bores formed through the flange of the branch pipe liner bag and bores of the bored plate attached on the surface of the flange (the surface in contact with the main pipe liner bag) and hardened therein, so that the flange of the branch pipe liner bag is more securely joined with the main pipe liner bag to provide a reliably integrated structure.

The above and other objects, features, and advantages of the present invention will become apparent from the following detailed description of the preferred embodiments thereof when read in conjunction with the accompanying drawings.

DESCRIPTION OF THE PREFERRED EMBODIMENTS

The present invention will hereinafter be described in connection with several preferred embodiments thereof with reference to the accompanying drawings.

Figure 1:
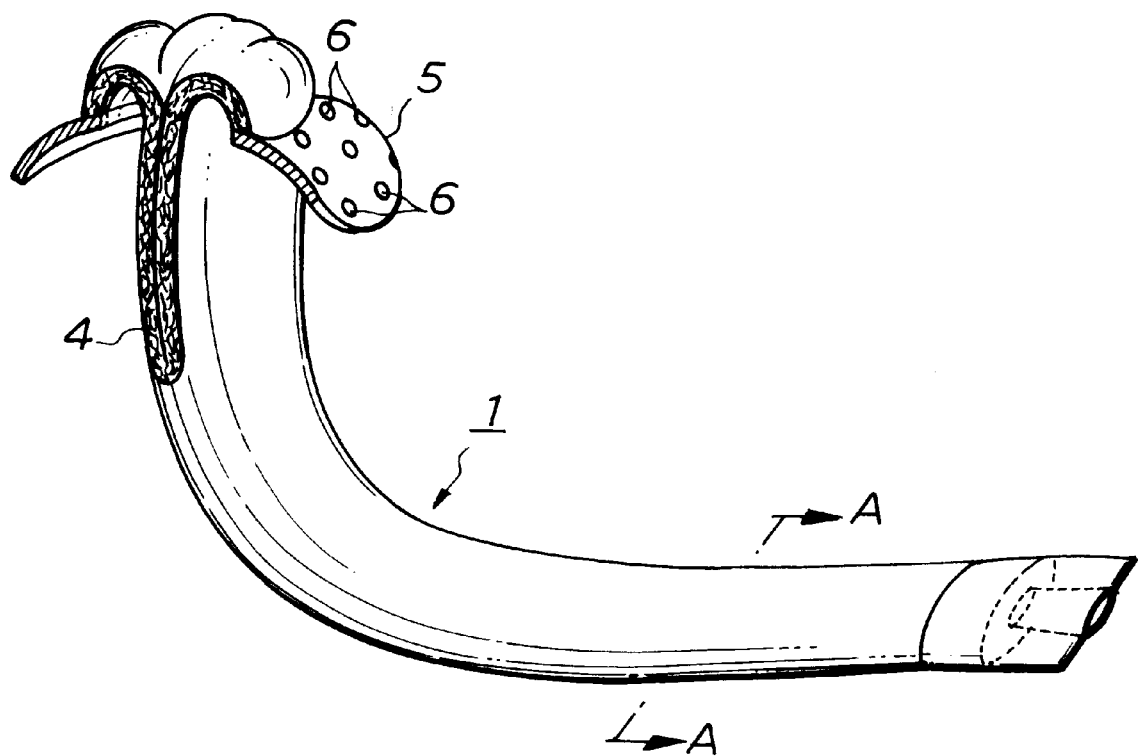
FIG. 1 is a partially exploded perspective view illustrating a branch pipe liner bag according to a first embodiment of the present invention.
Figure 2:
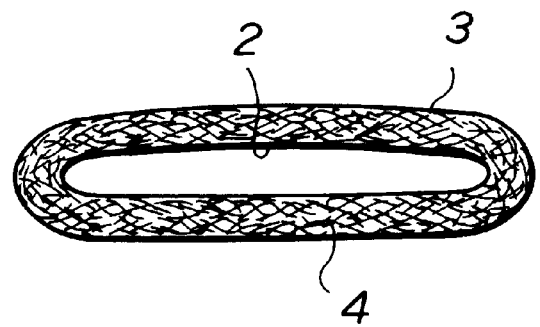
FIG. 2 is an enlarged cross-sectional view taken along a line A—A of FIG. 1.
Figure 3:
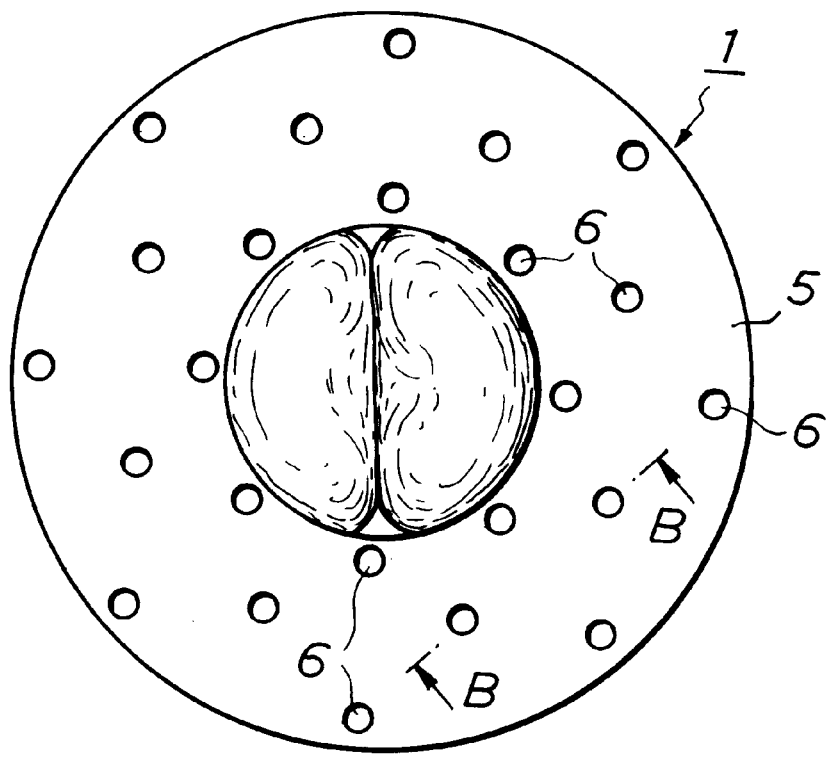
FIG. 3 is a top plan view of a flange forming part of the branch pipe liner bag illustrated in FIG. 1.
Figure 4:
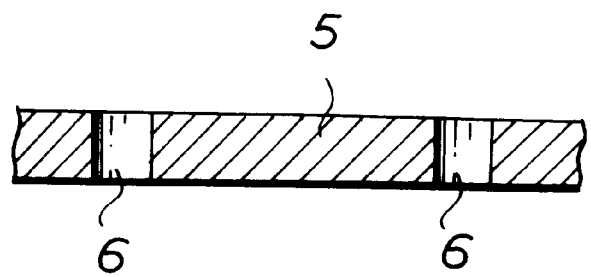
FIG. 4 is an enlarged cross-sectional view taken along a line B—B of FIG. 1.

FIG. 1 is a partially exploded perspective view illustrating a branch pipe liner bag according to a first embodiment of the present invention, FIG. 2 is an enlarged cross-sectional view taken along a line A—A of FIG. 1, and FIG. 3 is an enlarged cross-sectional view taken along a line B—B of FIG. 1.

Referring first to FIG. 1, a branch pipe liner bag 1 according to the first embodiment comprises a tubular resin-absorbent material 4, made of unwoven fabric such as polyester, polypropylene, acrylic fabric, or the like having the inner and outer surfaces covered with highly air-tight plastic films 2, 3, respectively. The tubular resin-absorbent material 4 is impregnated with an unhardened liquid thermosetting resin. The plastic films 2, 3 comprise a single-layered or a multi-layered structure made of polyurethane, polyethylene, nylon, ethylene vinyl alcohol, ionomer, admer, vinyl chloride, and so on. The thermosetting resin may be polyester resin, epoxy resin, vinyl ester resin, or the like.

One end of the tubular resin-absorbent material 4 is turned around to form a flange 5, as illustrated in FIG. 1. The flange 5 is curved to substantially match the curvature of a main pipe 10 (see FIG. 5), later described, and has the outer diameter larger than the inner diameter of a branch pipe 11 (see FIG. 5), later described. The flange 5 maintains its arcuate shape with the hardenable resin impregnated therein. It should be particularly pointed out that in the branch liner bag 1 according to the present invention, the flange 5 is formed with a plurality of bores 6 extending therethrough, as illustrated in FIG. 3.

Next, a pipe lining method according to the present invention, implemented using the branch pipe liner bag 1 constructed as described above, will be described below with reference to FIGS. 5–10.

Figure 5:
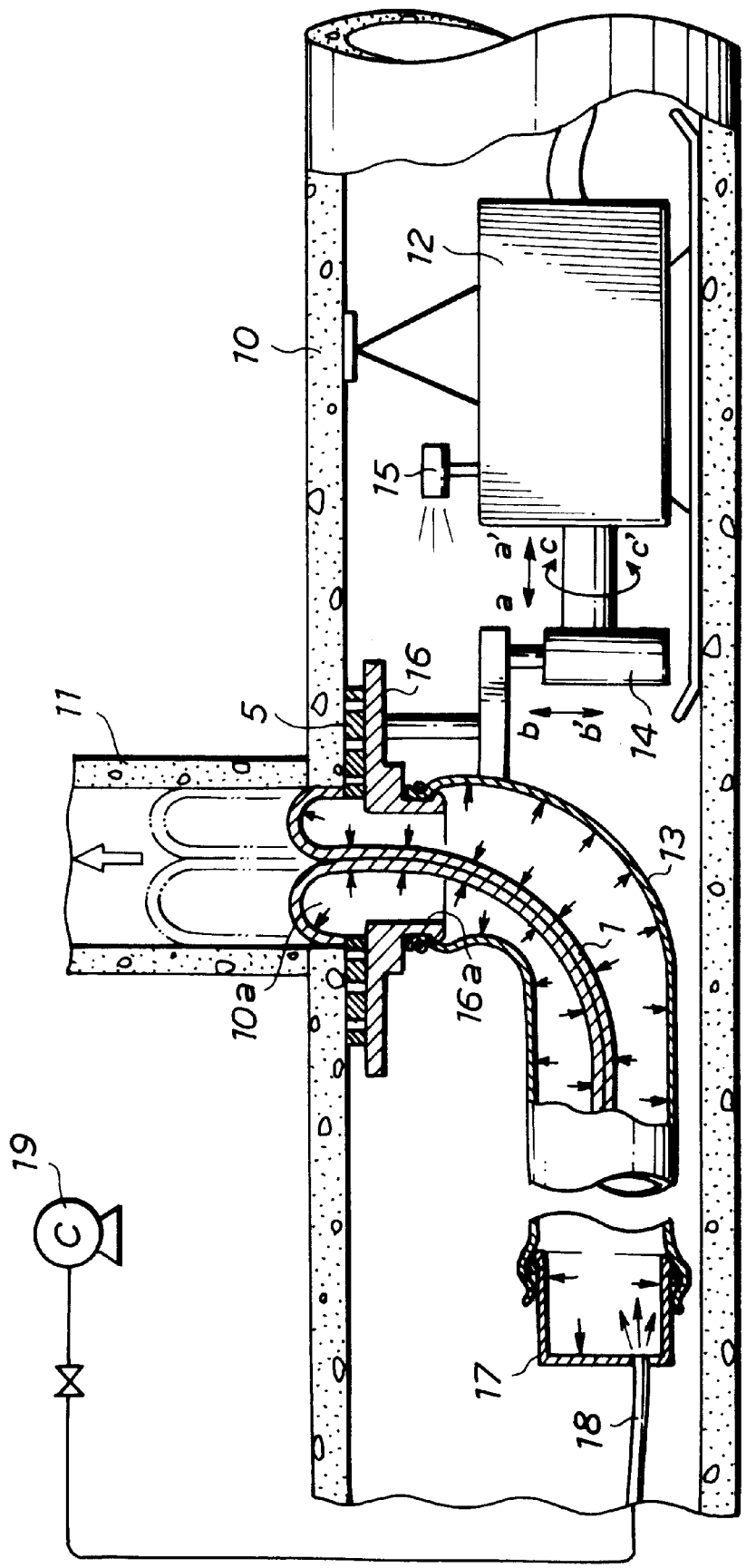
FIGS. 5–10 are cross-sectional views illustrating a pipe lining method according to the present invention.

FIGS. 5–10 are cross-sectional views illustrating the pipe lining method according to the present invention in the order of steps. Referring first to FIG. 5, there are illustrated the main pipe 10 and the branch pipe 11 having a smaller diameter and branched off the main pipe 10. Within the main pipe 10, a work robot 12 previously assembled on the ground, a pressure bag 13, a branch pipe liner bag 1, and so on have been introduced and set ready for the pipe lining operation.

The work robot 12 is hydraulically driven to advance and retract a head 14 thereof in the directions indicated by arrows a, a', raise and lower the head 14 in the directions indicated by arrows b, b', and rotate the head 14 in the directions indicated by arrows c, c' in FIG. 5. A TV camera 15 is installed on the top of the work robot 12. A set nozzle 16 is attached to the head 14 of the work robot 12, such that the flange 5 of the branch pipe liner bag 1 is securely set on the set nozzle 16. The remaining portion of the branch pipe liner bag 1 except for the flange 5 (uneverted portion) is accommodated in the pressure bag 13, as illustrated in FIG. 5.

The pressure bag 13 has one end thereof closed by a cap 17 and the other open end fixed to a cylindrical portion 16a of the set nozzle 16 as illustrated. Then, the pressure bag 13 is connected to a compressor 19 installed on the ground through an air hose 18 coupled to the cap 17.

While the situation within the main pipe 10 is being monitored through the TV camera 15 installed on the work robot 12, the flange 5 of the branch pipe liner bag 1 is positioned at a branch pipe opening 10a of the main pipe 10. Subsequently, the head 14 of the work robot 12 is moved in the direction indicated by the arrow b (upward direction) in FIG. 5 to press the flange 5 of the branch pipe liner bag 1 onto the periphery of the branch pipe opening 10a of the main pipe 10 to provide a close contact between the flange 5 and the periphery of the opening 10a.

Next, the compressor 19 installed on the ground is driven to supply compressed air to the pressure bag 13 through the air hose 18. Then, as indicated by broken lines in FIG. 5, the branch pipe liner bag 1, responsive to the pressure of the compressed air to evert and extend into the branch pipe 11 from the main branch 10 side to the ground in the direction indicated by the white arrow in the branch pipe 11.

Figure 6:
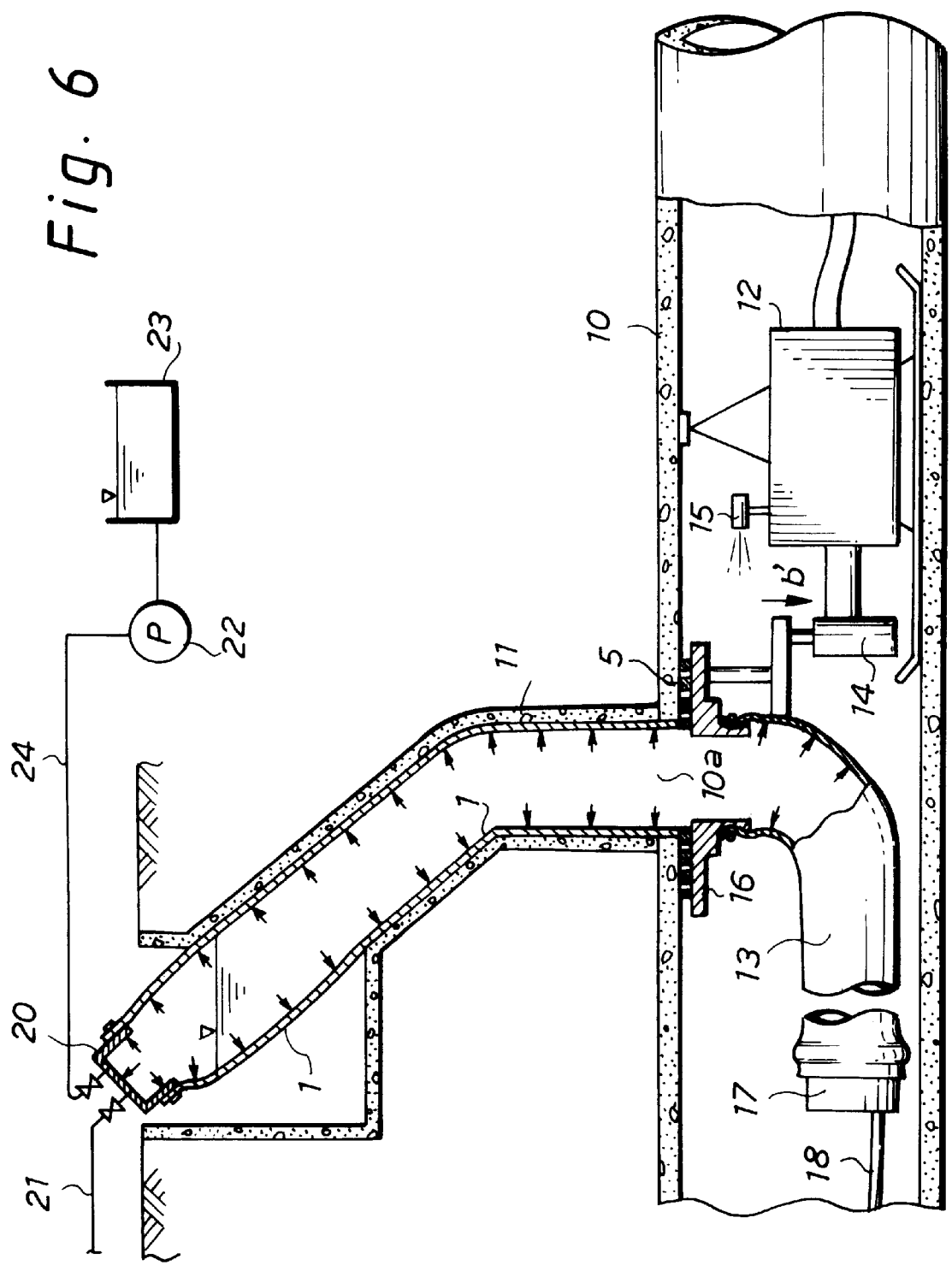

When the eversion or insertion of the branch pipe liner bag 1 is completed, a cap 20 is attached to a top end of the branch pipe liner bag 1, as illustrated in FIG. 6, and compressed air is supplied to the branch pipe liner bag 1 from an air hose 21 coupled to the cap 20 to press the branch pipe liner bag 1 onto the inner surface of the branch pipe 11. With this state maintained, a hot water pump 22 is driven to supply hot water stored in a hot water tank 23 to the branch pipe liner bag 1 through a hot water hose 24 to heat and therefore harden the thermosetting resin impregnated in the branch pipe liner bag 1, whereby the inner surface of the branch pipe 11 is lined with the hardened branch pipe liner bag 1. In this way, the branch pipe 11 is repaired.

Afterward, the hot water in the branch pipe liner bag 1 is removed, the head 14 of the work robot 12 is moved in the direction indicated by the arrow b' (downward direction), and the set nozzle 16 is detached from the branch pipe liner bag 1. Then, the work robot 12 is removed from the main pipe 10 together with the pressure bag 13 attached to the set nozzle 16, thus completing a series of lining operations performed for the branch pipe 11.

As the lining for the branch pipe 11 is completed, the main pipe 10 is next lined in the following manner.

Figure 7:
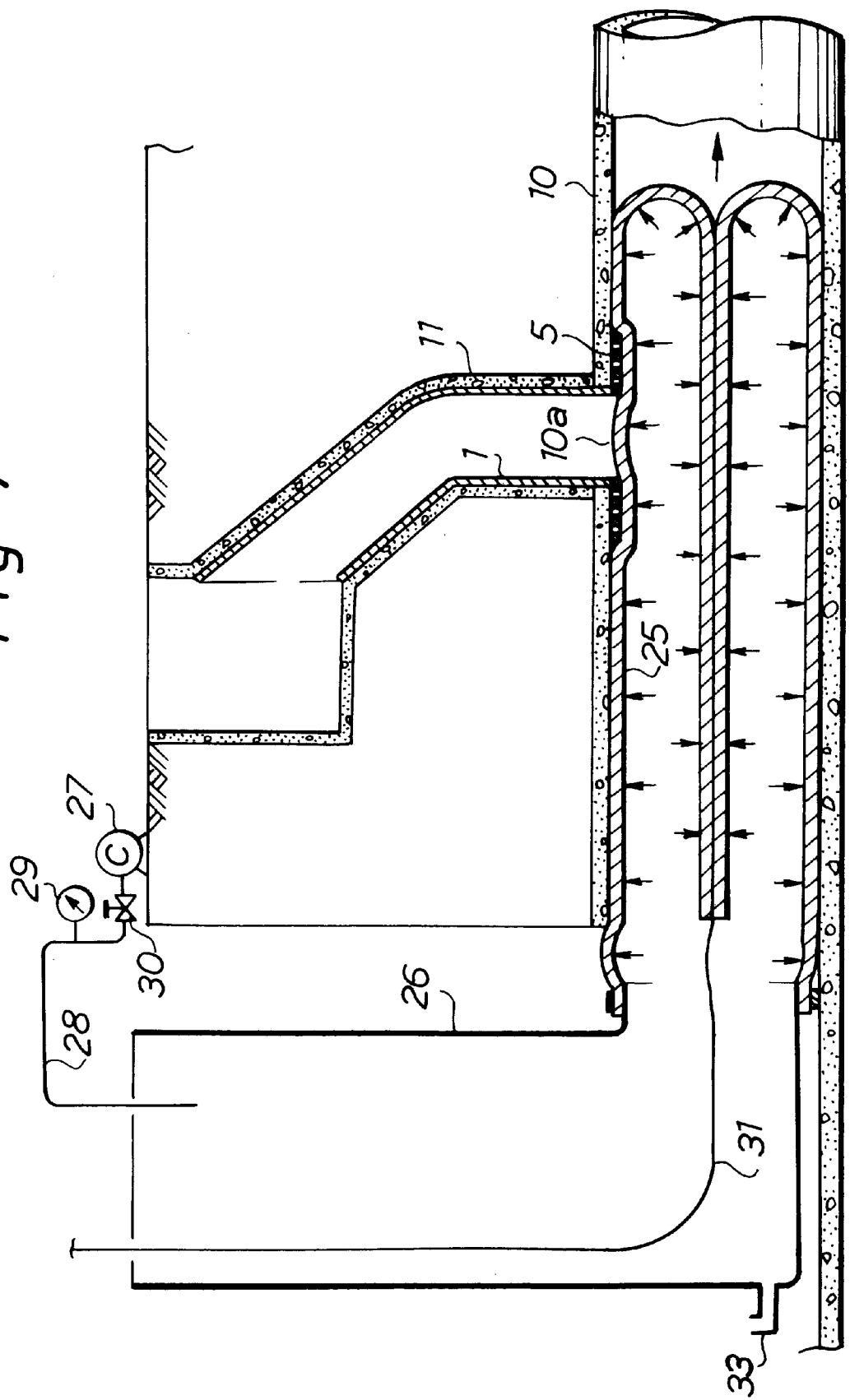

Referring to FIG. 7, a main pipe liner bag 25 has one end attached to the outer periphery of a lower opening of a pressure chamber 26. When a compressor 27 installed on the ground is driven to supply compressed air to the pressure chamber 26 through a pipe 28, the main pipe liner bag 25 is everted by the pressure of the compress ed air to extend into the main pipe 10 in the direction indicated by a horizontal arrow (to the right) in FIG. 7. The main pipe liner bag 25, which is constructed similar to the branch pipe liner bag 1, includes a tubular resin-absorbent material, impregnated with a thermosetting material, having at least its outer surface, before eversion, covered with a highly air-tight plastic film. As can be seen, a pressure gage 29 and a valve 30 are positioned in the midway of the pipe 28.

Figure 8:
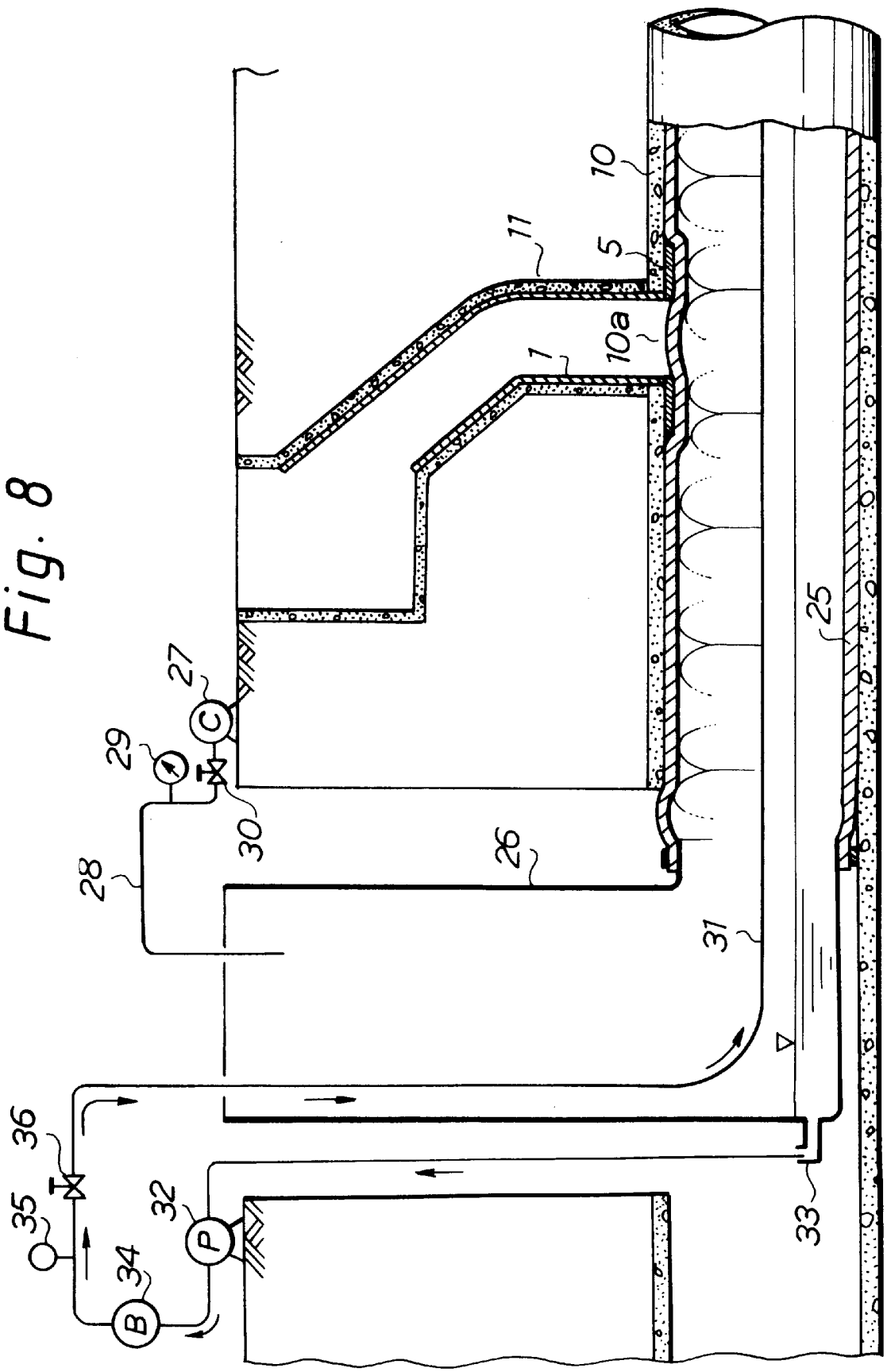
Figure 9:
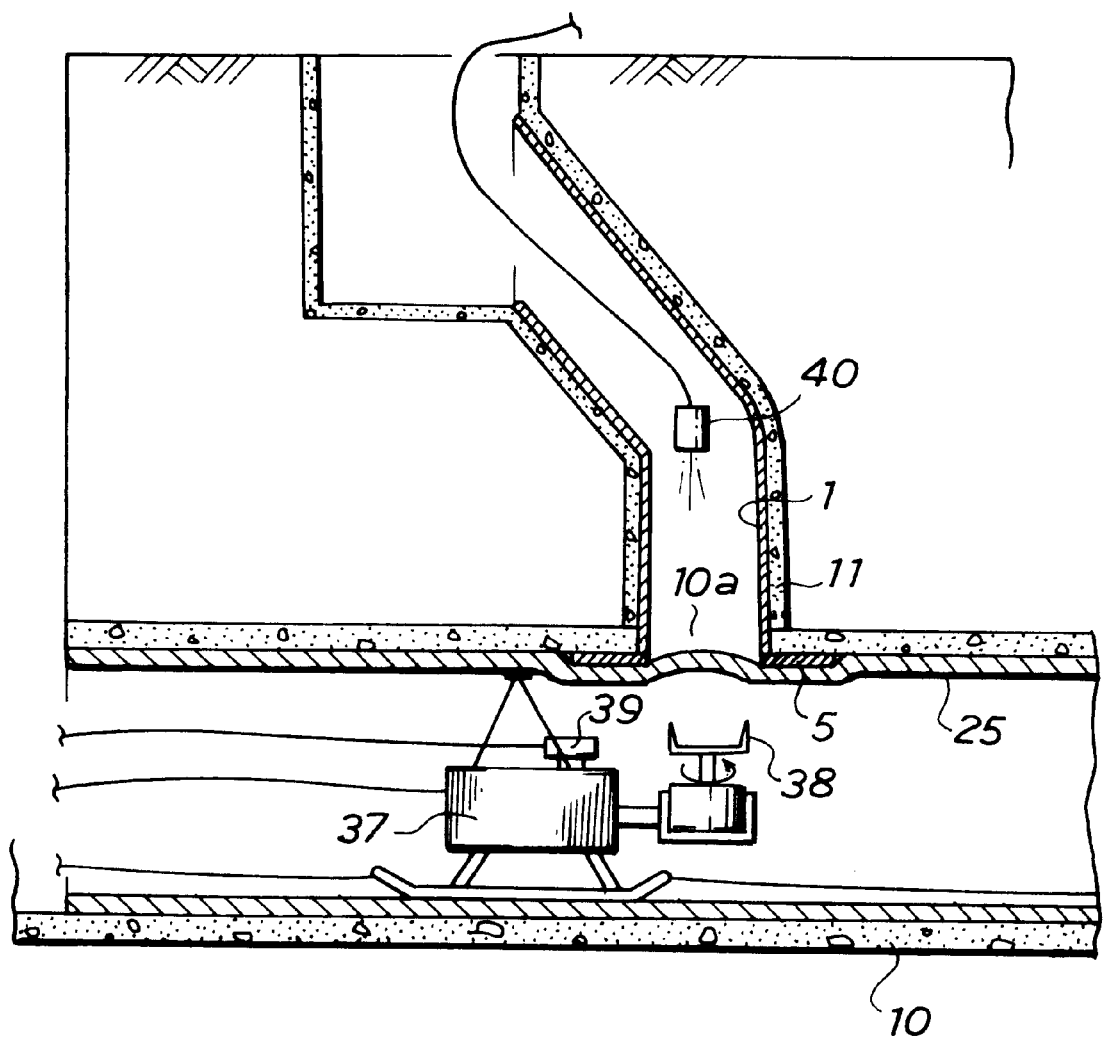
Figure 10:
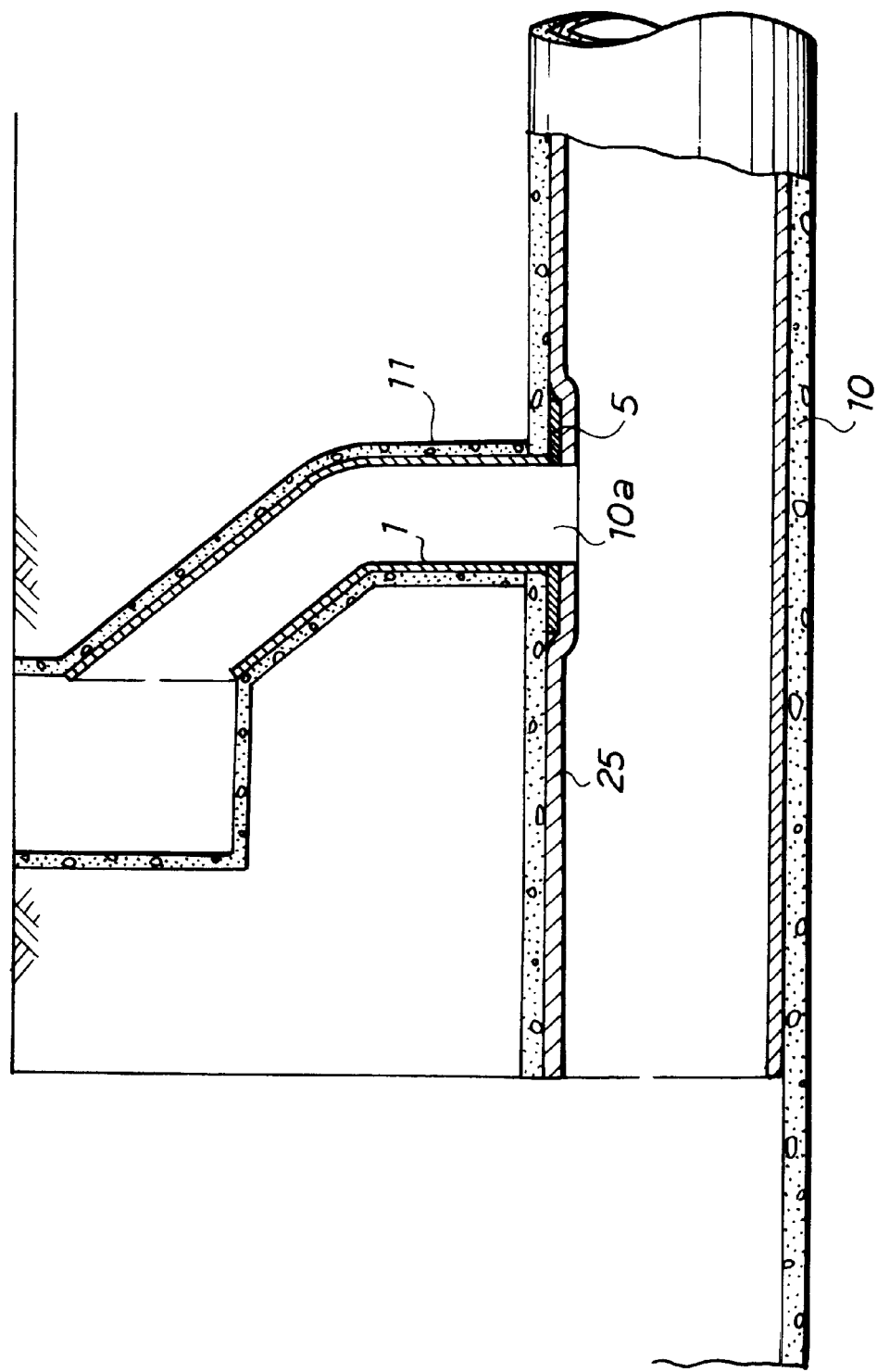

A hot water hose 31 is attached to one end of the main pipe liner bag 25. When the main pipe liner bag 25 is inserted inside out into the main pipe 10 over its entire length as illustrated in FIG. 8, the hot water hose 31 is drawn into the main pipe liner bag 25 and the pressure chamber 26. A portion of the hot water hose 31 facing the main pipe liner bag 25 is formed with a plurality of spray holes (not shown) for spraying hot water at appropriate intervals.

As illustrated in FIG. 8, a hot water pump 32 is also installed on the ground, and a suction side of the hot water pump 32 is connected to a hot water discharge pipe 33 coupled to a lower portion of the pressure chamber 26. A discharge side of the hot water pump 32 is connected to a boiler 34 to which the hot water hose 31 is connected. A thermometer 35 and a valve 36 are positioned in the midway of the hot water hose 31.

When compressed air is filled in the inside of the main pipe liner bag 25 and the pressure chamber 26 to press the main pipe liner bag 25 onto the inner surface of the main pipe 10, a portion of the unhardened thermosetting resin impregnated in the main pipe liner bag 25 oozes and enters the plurality of bores 6 formed through the flange 5 of the branch pipe liner bag 1.

As the hot water pump 32 and the boiler 34 are driven with the foregoing state maintained, hot water heated at a predetermined temperature by the boiler 34 flows through the hot water hose 31 in the direction indicated by arrows along the hot water hose 31 in FIG. 8 and sprays out from the plurality of spray holes formed through the hot water hose 31. In this way, the main pipe liner bag 25 receives spraying hot water from the inside, whereby the thermosetting resin impregnated in the main pipe liner bag 25 is hardened. The inner surface of the main pipe 10 is thus lined with the hardened main pipe liner bag 25 and repaired.

When the main pipe liner bag 25 is hardened, the portion of thermosetting resin oozing from the main pipe liner bag 25 and entering the plurality of bores 6 formed through the flange 5 of the branch pipe liner bag 1 is simultaneously hardened, so that the flange 5 of the branch pipe liner bag 1 is more securely joined with the main pipe liner bag 25 to provide a reliably integrated structure, thus ensuring to prevent a gap from being formed therebetween.

When the lining of the main pipe 10 is completed in the manner mentioned above, a cutter 38 mounted at the front end of the work robot 37, introduced into the main pipe 10, is driven to rotate to cut the main pipe liner bag 25 covering the branch pipe opening 10a, while monitoring the situation inside the main pipe 10 through the TC camera 39 installed on the work robot 37 and the TV camera 40 introduced into the branch pipe 11. In this way, the branch pipe 11 is open to the main pipe 10 so that the branch pipe 111 is placed in communication with the main pipe 110.

When the main pipe liner bag 25 is cut to place the branch pipe 11 in communication with the main pipe 10, the branch pipe 11 has been lined with the branch pipe liner bag 1, while the main pipe 10 has been lined with the main pipe liner bag 25, i.e., the two pipes have been repaired. Since the flange 5 of the branch liner bag 1 is securely joined with the main pipe liner bag 25 to provide a reliably integrated structure, the repaired main and branch pipes can eliminate a gap formed therebetween which would cause underground water or the like to intrude inside the pipes through the gap.

Figure 11:
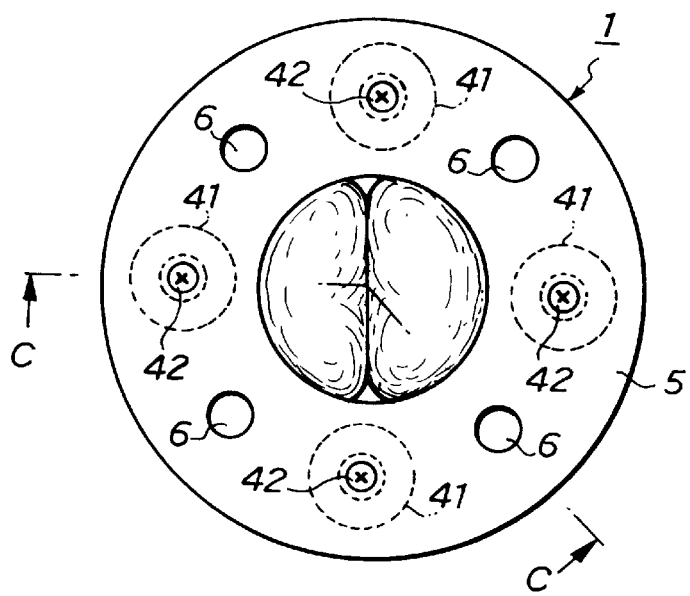
FIG. 11 is a top plan view of a branch pipe liner bag according to a second embodiment of the present invention.

Next, the branch liner bag according to a second embodiment will be described with reference to FIGS. 11 and 12. FIG. 11 is a top plan view illustrating the branch line bag 1 according to the second embodiment, and FIG. 12 is a cross-section al view taken along a line C—C of FIG. 11.

Figure 12:
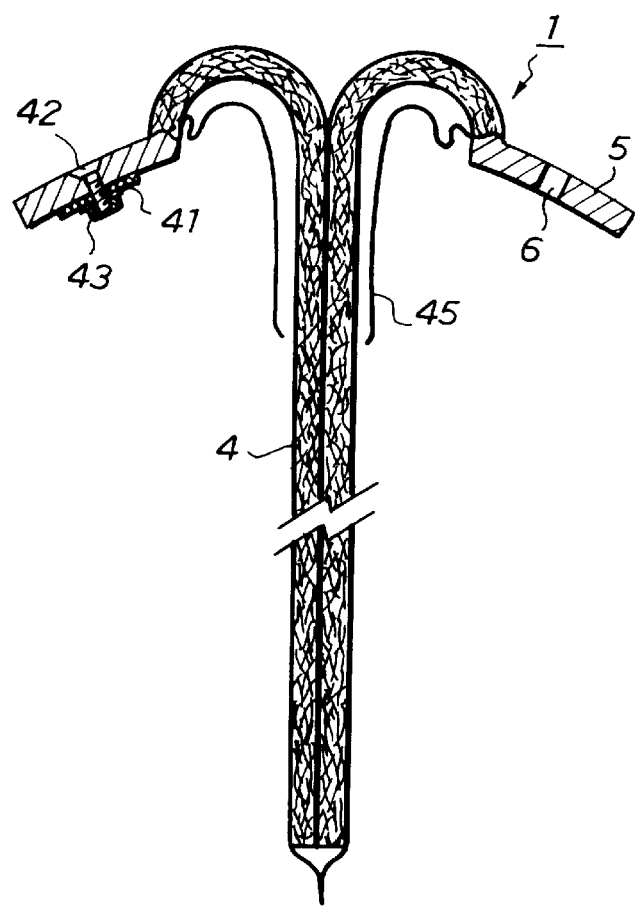
FIG. 12 is a cross-sectional view taken along a line C—C of FIG. 11.

The branch pipe liner bag 1 of the second embodiment is provided with a plurality of discoidal resin-absorbent materials 41 between adjacent bores 6 on the lower surface (the surface to be brought into contact with a main pipe liner bag 25) as illustrated in FIGS. 11 and 12. The discoidal resin-absorbent materials are attached on the lower surface of the flange 5 and each fixed by a bolt 42 and a nut 43. In another form, one end of a tear-off tube 45 may be temporarily attached on the outer surface of a tubular resin-absorbent material 4 near the flange 5, as illustrated in FIG. 12 (explanation of a branch pipe lining method using a tear-off tube is omitted).

Figure 13:
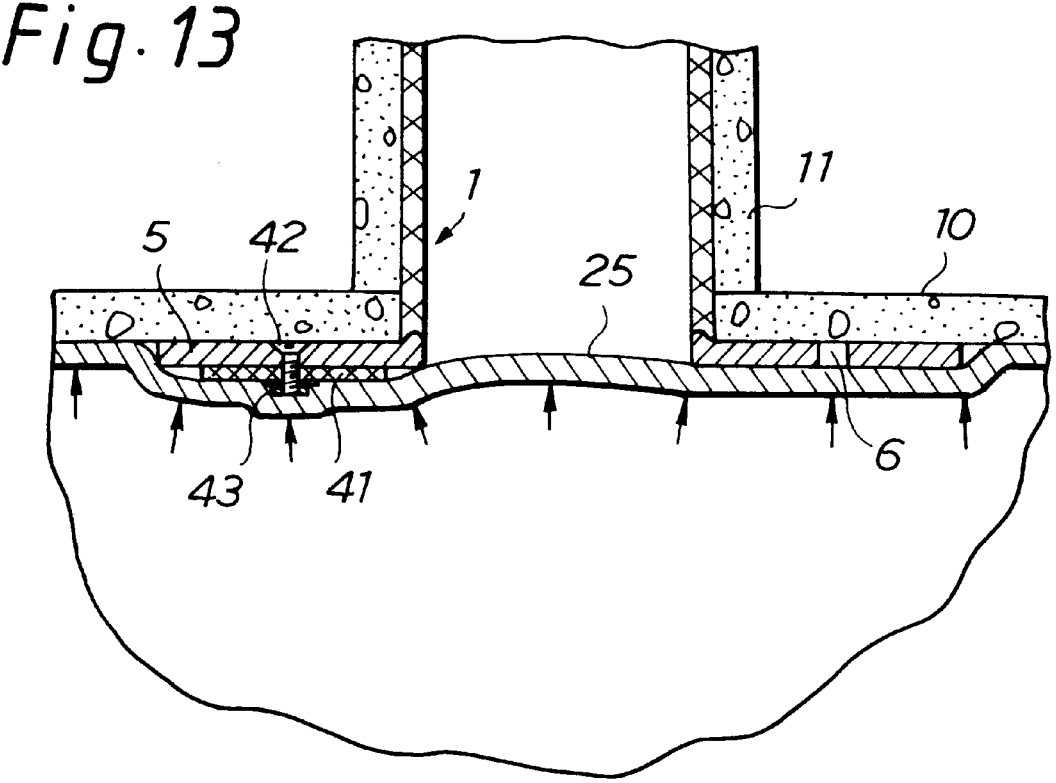
FIG. 13 is a partial cross-sectional view illustrating a condition near a branch pipe opening when a main pipe is lined.
Figure 14:
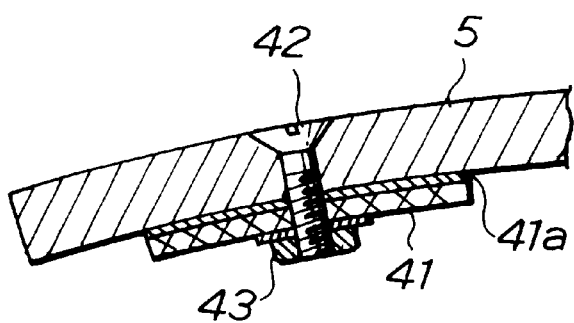
FIG. 14 is a partial cross-sectional view illustrating a flange of a branch pipe liner bag according to a second embodiment of the present invention.

After a branch pipe 11 has been lined using the branch pipe liner bag 1, the main pipe liner bag 25 is inserted inside out into a main pipe 10, as illustrated in FIG. 13, and a hardenable resin impregnated in the main pipe liner bag 25 is hardened with the main pipe liner bag 25 remaining pressed onto the inner surface of the main pipe 10. During this hardening process, a portion of unhardened liquid hardenable resin oozing from the main pipe liner bag 25 enters the bores 6 formed through the flange 5 of the branch pipe liner bag 1 as well as is impregnated into the resin-absorbent material disks 41 attached on the flange 5. The liquid hardenable resin entering the bores 6 and impregnated into the disks 41 is also hardened so that the flange 5 of the branch pipe liner bag 1 is more securely joined with the main pipe liner bag 25 to provide a more reliably integrated structure.

If the resin-absorbent material disks 41 attached on the flange 5 of the branch pipe liner bag 1 are too large, the resin-absorbent material disks 41 may hang to cause deformation before the main pipe 10 is lined. To solve this inconvenience, the hardenable resin may be partially impregnated into a side portion of the resin-absorbent material disk 41 to be brought into contact with the flange 5 and hardened to form a hard layer 41a which can eliminate the hanging and deformation of the resin-absorbent material disk 41.

Figure 15:
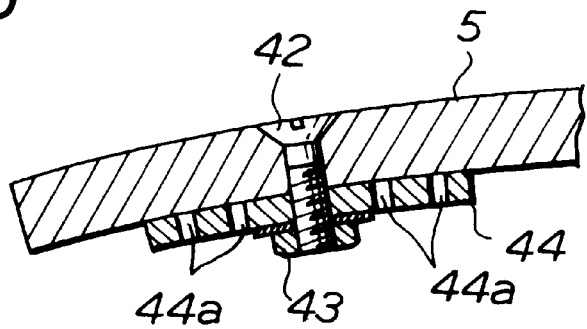
FIG. 15 is another partial cross-sectional view illustrating a flange of a branch pipe liner bag according to the second embodiment of the present invention.

Alternatively, a bored plate 44 may be used in place of the resin-absorbent material disk 41, as illustrated in FIG. 15. The bored plate 44 is similarly attached on the lower surface of the flange 5 with a bolt 42 and a nut 43. After the branch pipe 11 is lined using a branch pipe liner bag 1 comprising the bored plates 41 and the main pipe liner bag 25 is inserted inside out into the main pipe 10 and pressed onto the inner surface of the main pipe 10, a portion of unhardened hardenable resin oozing from the main pipe liner bag 25 enters the bores 6 (see FIGS. 11 and 12) formed through the flange 5 of the branch pipe liner bag 1 and bores 44a of the bored plates 44 and hardened, so that the flange 5 of the branch pipe liner bag 1 is more securely joined with the main pipe liner bag 25 to provide a more reliably integrated structure.

Figure 16:
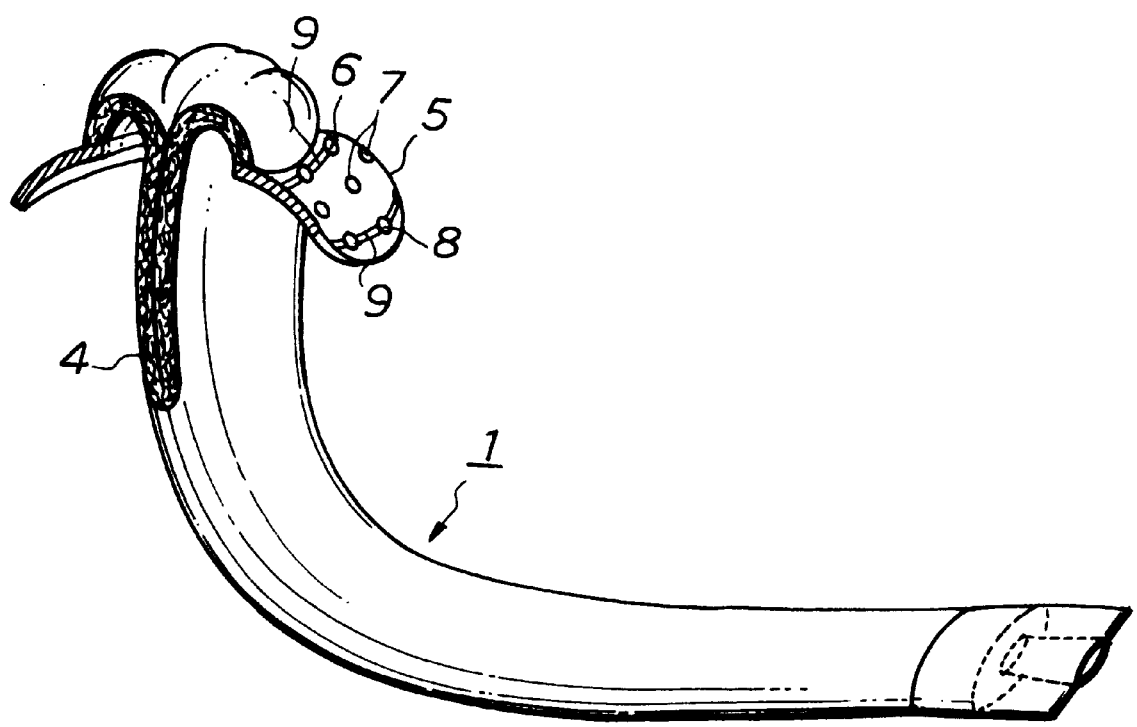
FIG. 16 is a partially exploded perspective view illustrating a branch pipe liner bag according to a third embodiment of the present invention.

Next, a branch pipe liner bag according to a third embodiment of the present invention will be described with reference to FIGS. 16–19. FIG. 16 is a partially exploded perspective view illustrating a branch pipe liner bag according to the third embodiment, FIG. 17 is a top plan view of a flange forming part of the branch pipe liner bag, FIG. 18 is an enlarged cross-sectional view taken along a line D—D of FIG. 17, and FIG. 19 is a cross-sectional view showing a cutting operation for cutting a main pipe liner bag.

Figure 17:
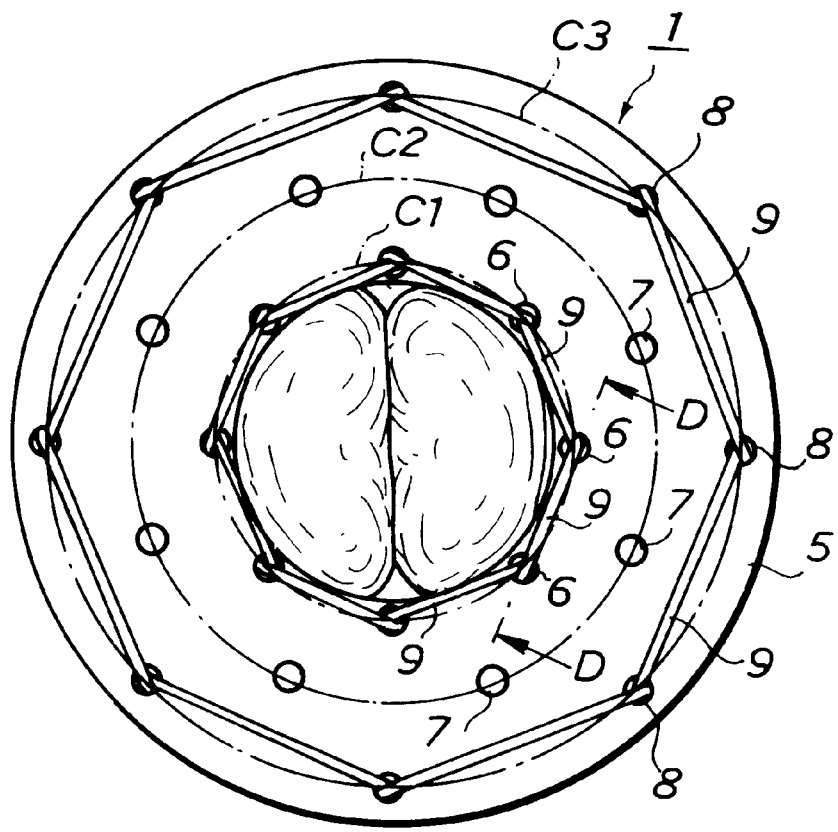
FIG. 17 is a top plan view of a flange forming part of the branch pipe liner bag illustrated in FIG. 16.

As illustrated in FIG. 17, the branch pipe liner bag 1 according to the third embodiment has a flange 5 which is formed with a plurality of bores 6, 7, 8 along three concentric circles C1, C2, and C3 at regular angular intervals. A pair of cords 9 made of a resin-absorbent material are passed through the plurality of bores 6 formed through the flange 5 on the concentric circle C1 along the inner periphery of the flange 5, so that the adjacent bores 6 are coupled by the resin-absorbent material cords 9, as can be best seen in FIG. 18.

Similarly, a pair of resin-absorbent material cords 9 are passed through the plurality of bores 8 formed through the flange 5 on the concentric circle C3 along the outer periphery of the flange 5, so that the adjacent bores 8 are coupled by the resin absorbent material cords 9.

Figure 18:
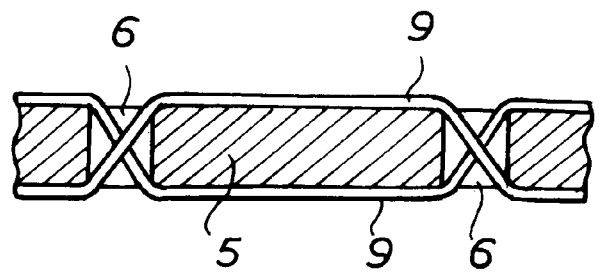
FIG. 18 is an enlarged cross-sectional view taken along a line D—D of FIG. 17.
Figure 19:
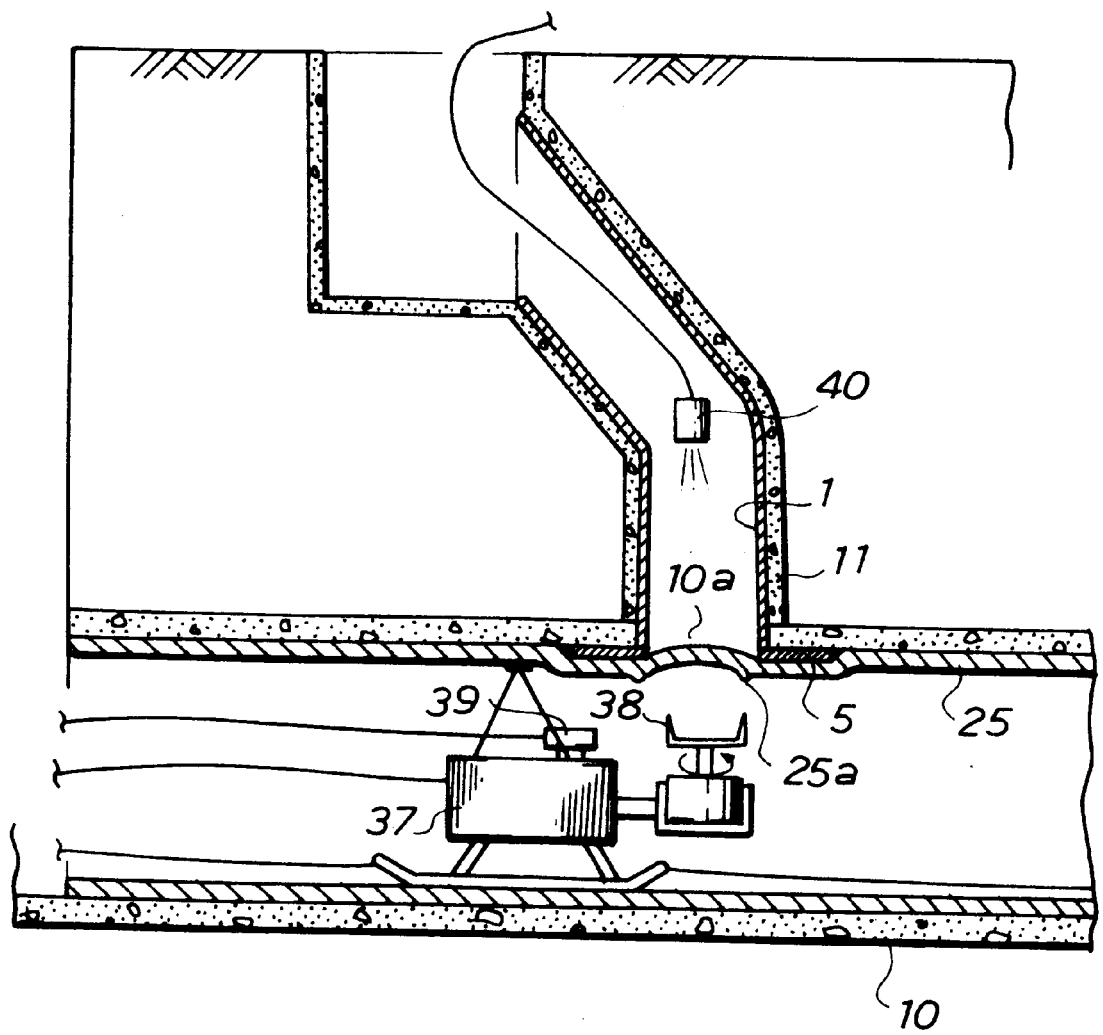
FIG. 19 is a cross-sectional view showing a cutting operation for cutting the main pipe liner bag.
Figure 20:
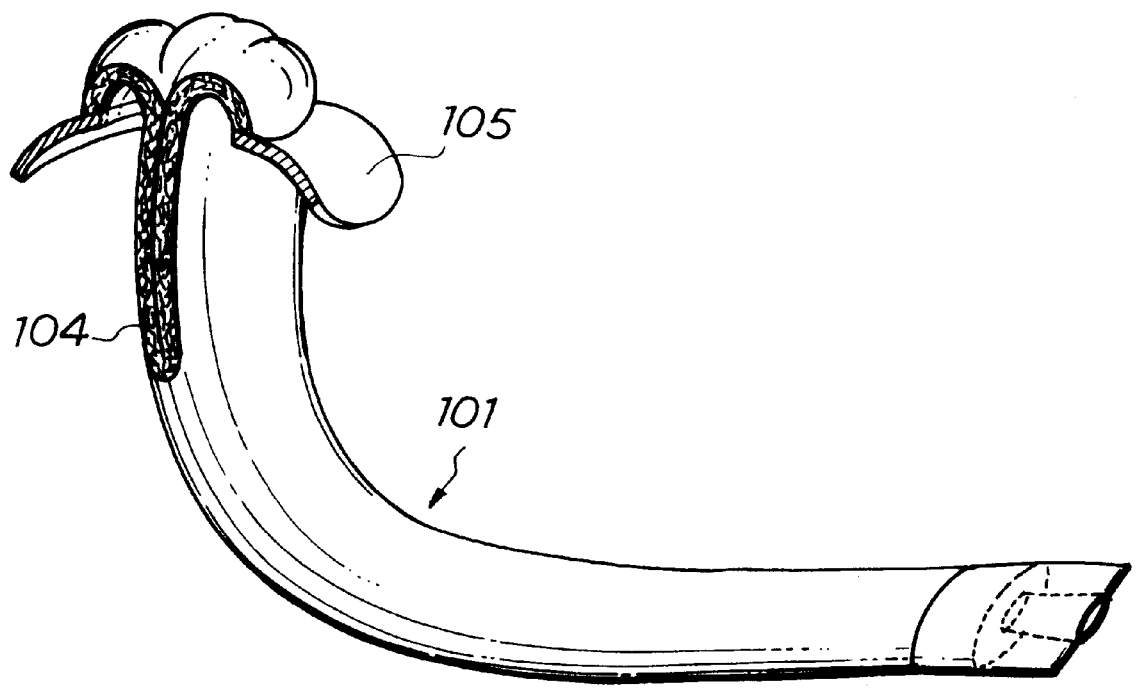
FIG. 20 is a partially exploded perspective view illustrating a conventional branch pipe liner bag.
Figure 21:
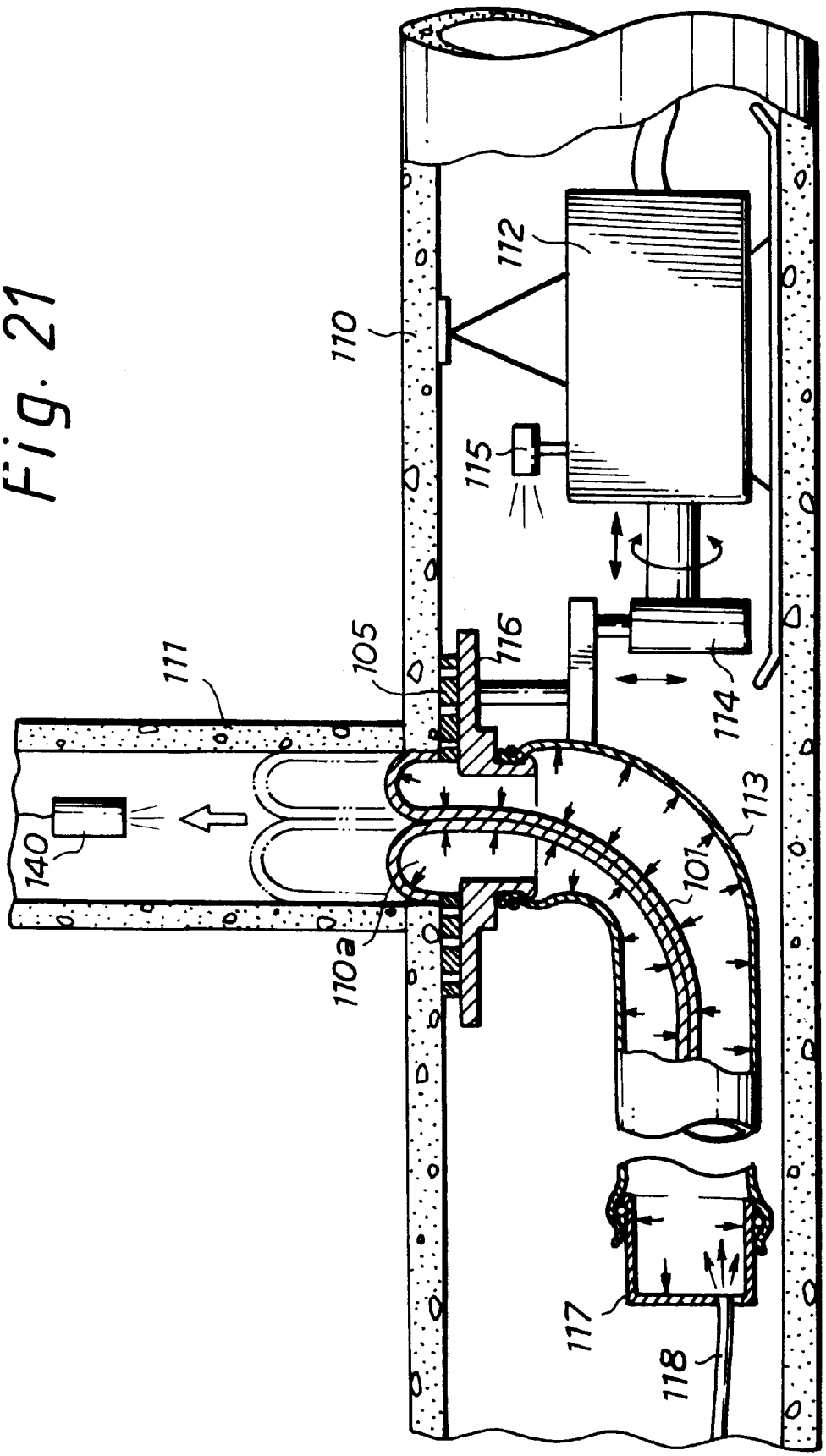
FIGS. 21–23 are cross-sectional views illustrating a conventional pipe lining method.
Figure 22:
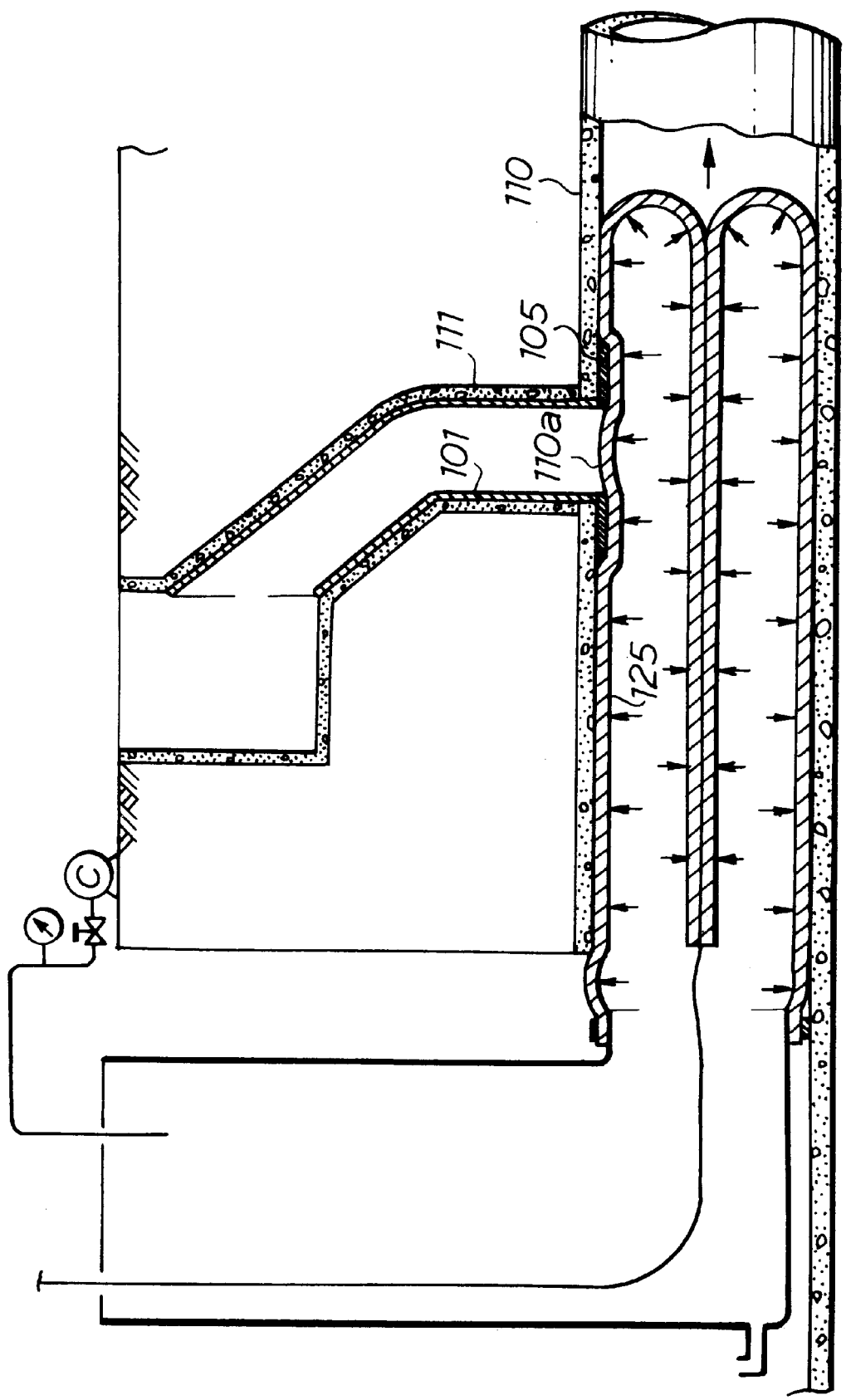
Figure 23:
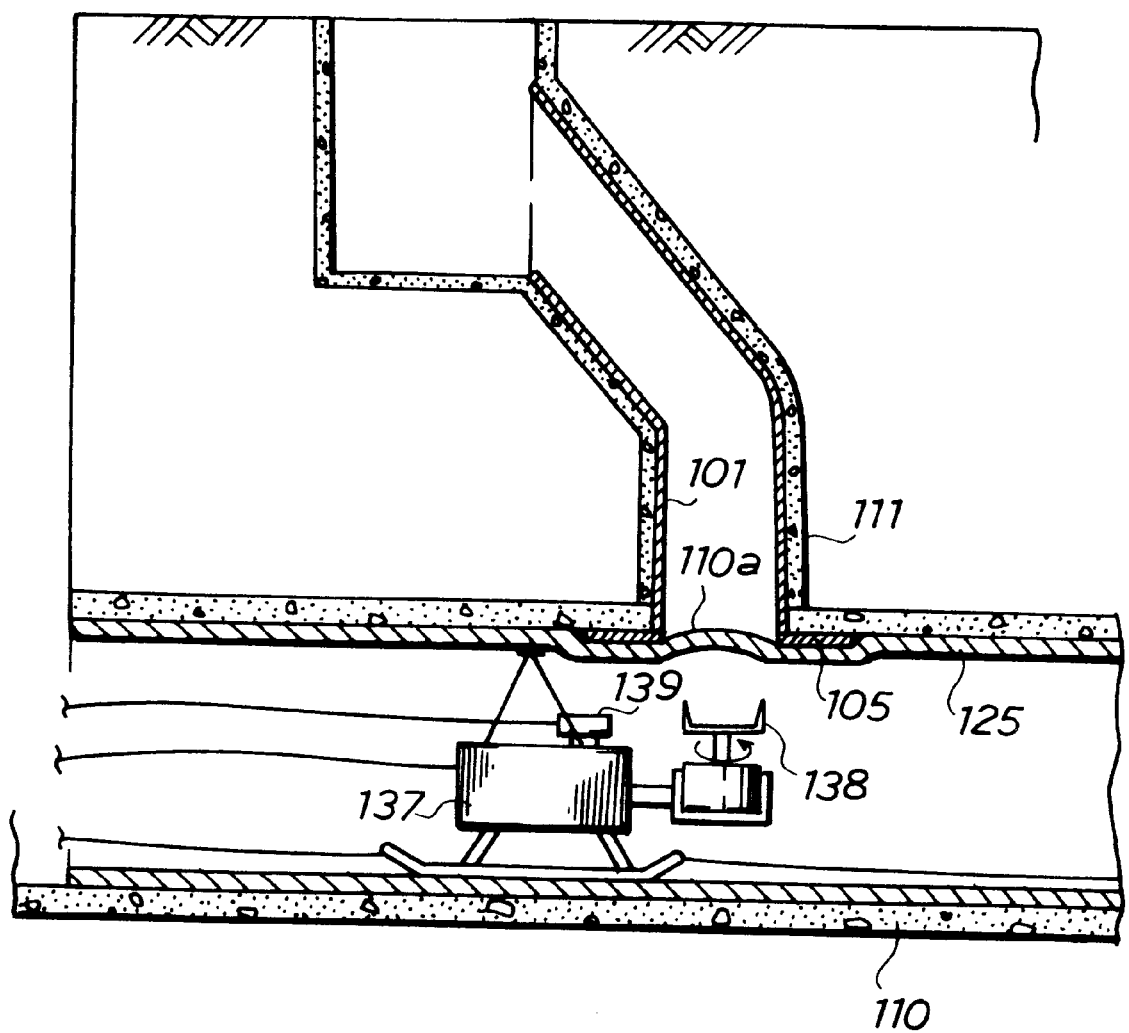

As illustrated in FIG. 18, the resin-absorbent material cords 9 appear on both upper and lower surfaces of the flange 5. It should be noted that while the same material is used for the resin-absorbent material cords 9 as the aforementioned tubular resin-absorbent material 4, the cords 9 are not impregnated with a thermosetting resin.

When the main pipe 10 is lined using the main pipe liner bag 25 after the branch pipe 11 has been lined using the branch pipe liner bag 1 according to the third embodiment, a portion of unhardened liquid hardenable resin oozing from the main pipe liner bag 25 enters the plurality of bores 6, 7, 8 formed through the flange 5 of the branch pipe liner bag 1 as well as is impregnated into the resin-absorbent material cords 9, and is simultaneously hardened during the hardening of the main pipe liner bag 25. Thus, the flange 5 of the branch pipe liner bag 1 can be more securely joined with the main pipe liner bag 25 to provide a more reliably integrated structure, thereby ensuring to prevent a gap from being formed therebetween. When the lining of the main pipe 10 is completed in the manner mentioned above, a cutter 38 mounted at the front end of a work robot 37, introduced into the main pipe 10, is driven to rotate to cut the main pipe liner bag 25 covering a branch pipe opening 10a, while monitoring the situation inside the main pipe 10 through a TC camera 39 installed on the work robot 37 and a TV camera 40 introduced into the branch pipe 11. In this way, the branch pipe 11 is open to the main pipe 10 so that the branch pipe 111 is placed in communication with the main pipe 110.

According to the third embodiment, the plurality of bores 6 are formed through the flange 5 of the branch pipe liner bag 1 on the concentric circle C1 along the inner periphery of the flange 5, and the pair of resin-absorbent material cords 9 are passed through the bores 6 to couple the adjacent bores 6 by the resin-absorbent material cords 9. Thus, as illustrated in FIG. 19, the main pipe liner bag 25 located on the periphery 25a of the branch pipe opening 10a protrudes due to the underlying resin-absorbent material cords 9. Therefore, by positioning the cutter 38 with the protrusion serving as a guide, a portion of the main pipe liner bag 25 covering the branch pipe opening 10a can be readily and accurately cut.

As will be apparent from the foregoing description of the preferred embodiments, according to the pipe lining method of the present invention utilizing the branch pipe liner bag of the first embodiment, a portion of unhardened hardenable resin oozing from the main pipe liner bag enters the bores formed through the flange of the branch pipe liner bag and is hardened therein, so that the flange of the branch pipe liner bag is securely joined with the main pipe liner bag, thus preventing a gap from being formed therebetween.

When the pipe lining method is implemented using the branch pipe liner bag according to the second embodiment, a portion of unhardened hardenable resin oozing from the main pipe liner bag not only enters the bores formed through the flange of the branch pipe liner bag and is hardened therein, but also is impregnated into the resin-absorbent material member attached on the surface of the flange (the surface in contact with the main pipe liner bag), so that the flange of the branch pipe liner bag is more securely joined with the main pipe liner bag to provide a reliably integrated structure.

When the pipe lining method is implemented using the branch pipe liner bag which comprises a bored plate attached on a surface of the flange of the tubular resin-absorbent material, a portion of unhardened hardenable resin oozing from the main pipe liner bag enters the bores formed through the flange of the branch pipe liner bag and bores of the bored plate attached on the surface of the flange (the surface in contact with the main pipe liner bag) and hardened therein, so that the flange of the branch pipe liner bag is more securely joined with the main pipe liner bag to provide a reliably integrated structure.

When the pipe lining method is implemented using the branch pipe liner bag of the third embodiment is used, the unhardened hardenable resin oozing from the main pipe liner bag not only enters the bores formed through the flange but also is impregnated into the resin-absorbent material cords, so that the flange of the branch pipe liner bag is more securely joined with the main pipe liner bag to provide a reliably integrated structure.

In addition, since the plurality of bores are positioned on a concentric circle along the inner periphery of the flange of the tubular resin-absorbent material, and the cords made of a resin-absorbent material are passed through the bores to couple adjacent ones of the bores by the cords, a portion of the main pipe liner bag located on the periphery of a branch pipe opening is protruded due to the underlying cords, so that a cutter may be positioned with the protrusion serving as a guide to readily and accurately cut a portion of the main pipe liner bag covering the branch pipe opening.

While the present invention has been described in connection with its preferred embodiments, it is to be understood that various modifications will occur to those skilled in the art without departing from the spirit of the invention. The scope of the present invention is therefore to be determined solely by the appended claims.

What is claimed is:

1. A pipe lining method comprising the steps of:
   preparing a branch pipe liner bag comprising a tubular resin-absorbent material impregnated with an unhardened hardenable resin, a rigid flange formed at one end of said tubular resin-absorbent material, and a first set of bores formed through said flange and arranged about an inner periphery of said flange; and
   inserting said branch pipe liner bag into a main pipe;
   pressing said flange of said branch pipe liner bag onto the periphery of a branch pipe opening of said main pipe;
   inserting said branch pipe liner bag inside out into a branch pipe from the main pipe side to the ground by a fluid pressure with said flange remaining pressed onto the periphery of the branch pipe opening;
   hardening the hardenable resin impregnated in said branch liner bag with said branch pipe liner bag pressed onto the surface of the branch pipe;
   preparing a main pipe liner bag comprising a tubular resin-absorbent material impregnated with a hardenable resin;
   inserting said main pipe liner bag inside out into the inner main pipe by a fluid pressure;
   pressing said main pipe liner bag onto the inner surface of the main pipe and the first set of bores such that a portion of the hardenable resin in said main pipe liner bag enters into the first set of bores;
   hardening the hardenable resin impregnated in said main pipe liner bag and the first set of bores with said main pipe liner bag remaining pressed on the inner surface of the main pipe;
   after hardening said main pipe liner bag, cutting a portion of said main pipe liner bag covering the branch pipe opening.

2. A pipe lining method according to claim 1, further comprising the step of passing at least one cord made of resin-absorbent material through at least a portion of said bores formed through said flange to couple adjacent ones of said bores by said cord before the step of inserting said branch pipe liner bag into the main pipe.

3. A pipe lining method according to claim 2, wherein said bores are positioned on a concentric circle along the inner periphery of said flange of said branch pipe liner bag, and said cord is passed through said bores to couple adjacent ones of said bores by said cord.

4. A pipe lining method according to claim 1, wherein a resin-absorbent material member is attached on a surface of said flange of said branch pipe liner bag.

5. A pipe lining method according to claim 4, wherein said resin-absorbent material member includes a hard layer which contacts said flange.

6. A pipe lining method according to claim 1, wherein a bored plate is attached on a surface of said flange of said tubular resin-absorbent material.

7. A pipe lining method according to claim 1, wherein:
   at least a second set of bores is formed through said flange,
   wherein said at least a second set of bores is arranged about said first set of bores, and
   wherein the hardenable resin in said main pipe liner bag permeates into, and hardens in, the at least a second set of bores.

* * * * *